United States Patent
Risberg et al.

Patent Number: 5,207,399
Date of Patent: May 4, 1993

[54] VAPOR PRESSURIZATION SYSTEM FOR OUTER SPACE

[75] Inventors: Jay A. Risberg; Luciano M. J. Sedillo, both of San Diego, Calif.

[73] Assignee: General Dynamics Corporation, Space Systems Division, San Diego, Calif.

[21] Appl. No.: 854,198

[22] Filed: Mar. 20, 1992

[51] Int. Cl.$^5$ .............................................. B64G 1/40
[52] U.S. Cl. ...................................... 244/172; 60/259; 60/39.48; 137/340
[58] Field of Search ..................... 244/172, 74; 60/259, 60/267, 266, 39.48; 137/340, 566

[56] References Cited

U.S. PATENT DOCUMENTS

| | | | |
|---|---|---|---|
| 3,473,343 | 10/1969 | Chamberlain | 60/39.48 |
| 3,591,967 | 7/1971 | Paine et al. | 60/39.48 |
| 4,879,874 | 11/1989 | Koyari et al. | 60/259 |

Primary Examiner—Joseph F. Peters, Jr.
Assistant Examiner—Christopher P. Ellis
Attorney, Agent, or Firm—John R. Duncan; Frank D. Gilliam

[57] ABSTRACT

A cold vapor pressurization system for outer space vehicles that is used prior to and during engine burn to pressurize its fuel tank and oxidizer tank to produce the required engines net positive suction pressure (NPSP). The engine start system uses reaction control system (RCS) hydrazine to pass through a gas generator where it is disassociated. The by-products are then introduced into the hot side of the propellant heat exchangers. An oxidizer feed system and a fuel feed system pass through the respective cold sides of the heat exchangers to vaporize the propellants which are then used to produce the required engine NPSP for the oxidizer tank and fuel tank respectively. This system could also be used to provide engine NPSP during engine burn.

3 Claims, 1 Drawing Sheet

VAPOR PRESSURIZATION SYSTEM FOR OUTER SPACE

BACKGROUND OF THE INVENTION

The present invention relates to outer space vehicles and more specifically to a cold vapor pressurization system that is used both during engine start and engine burn to provide the required engine net positive suction pressure (NPSP).

The current liquid propellant upper stage engine is pressure fed, meaning that the engine start thrust transient is directly proportional to tank pressure. The primary requirement for pressurization in support of engine start is to supply propellants to the engine at the required conditions (i.e., temperature and pressure). Net positive suction pressure is defined as the difference in total pressure and propellant vapor pressure at the engine inlet. A minimum NPSP value is established through engine performance tests. The tank pressurization system must guarantee engine NPSP start and steady-state levels.

The method presently used for providing engine NPSP is a high pressure ($\approx$3300 to 4000 psi) ambiently stored gaseous helium system. This helium is contained in multiple bottles which are manifolded together. These bottles are connected to the fuel and oxidizer tanks through tubing. Solenoid valves, coupled with fixed orifices, are cycled on and off to control the flow of helium from the bottles and maintain the appropriate tank pressure level to provide the required engine NPSP. Propellant tank pressurization is required for the pumped engine system to provide sufficient ullage pressure required to suppress cavitation in the engine turbopump.

SUMMARY OF THE INVENTION

The novel cold vapor pressurization system has been designed for use with outer space vehicles and it is used for engine start to pressurize the fuel tank and the oxidizer tank in order to produce the required engine net positive suction pressure.

The cold vapor pressurization system for engine start is conceptually identical for both the fuel and oxidizer propellant tanks. Each system consists of a pump, solenoid control valves, orifice plates, heat exchanger, and a feedback control system. Reaction control system (RCS) hydrazine is passed through a gas generator where it is dissociated via a catalyst. The by-products are then introduced into the hot side of the propellant heat exchangers. The determination of which heat exchanger the by-products pass through first is a function of the logarithmic mean temperature difference (LMTD). Properly sized heat exchangers will vaporize the fuel and oxidizer and bring them to the required temperature. This vaporized propellant is then used to pressurize the propellant tank and produce the required engine NPSP. The cooled hydrazine by-products are expelled through the RCS settling thrusters. This system could also be used to provide engine NPSP during engine burn.

It is an object of the invention to provide a novel cold vapor pressurization system that can be used to provide engine NPSP during engine start.

It is also an object of the invention to provide a novel cold vapor pressurization system for engine start that utilizes reaction control system (RCS) hydrazine which is passed through a pair of heat exchangers.

Other objects and features of the invention will become apparent as the drawings which follow are understood by reading the corresponding description thereof.

BRIEF DESCRIPTION OF THE DRAWING FIGURES

FIG. 1 is a schematic illustration showing a rocket in which the cold vapor pressurization system would be used and FIG. 2 is a schematic illustration of the cold vapor pressurization system used for engine start.

DESCRIPTION OF THE PREFERRED EMBODIMENT

Figure 1:
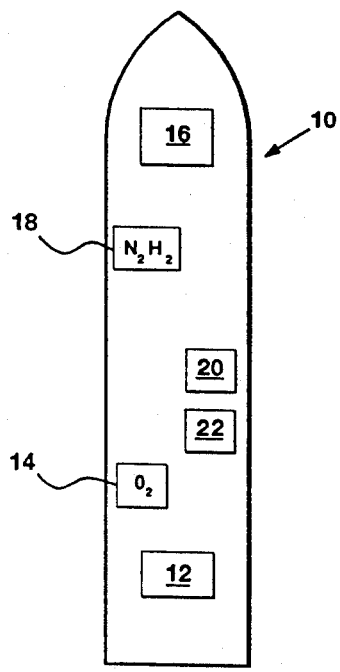
Figure 2:
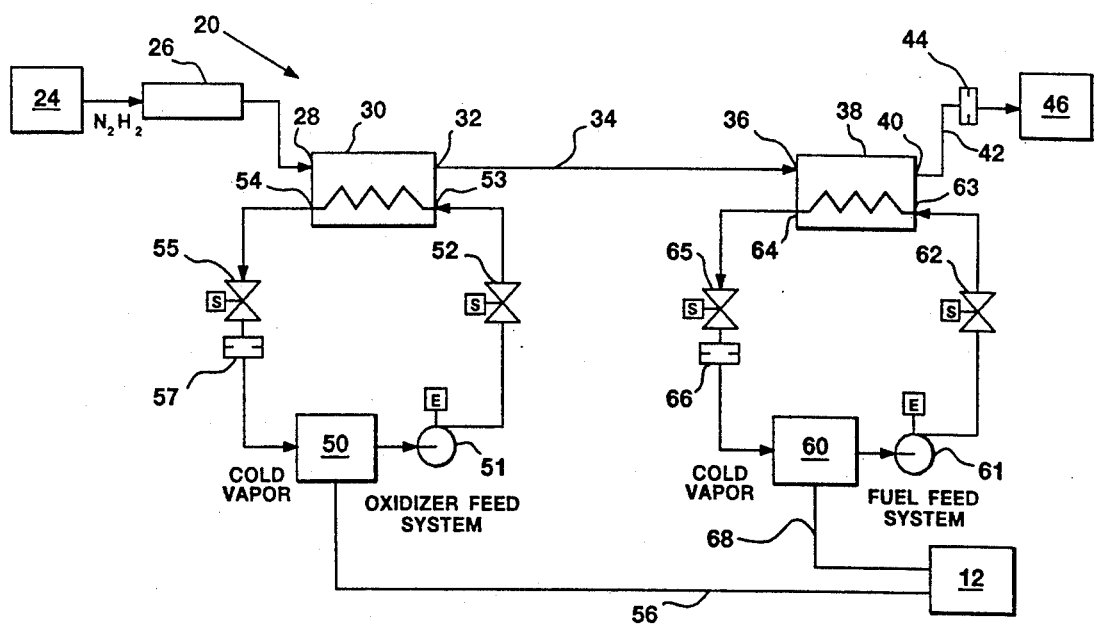

The novel cold vapor pressurization system will be illustrated by referring to FIGS. 1–2 of the drawing. FIG. 1 illustrates some of the basic components of the rocket 10.

It has an engine 12, a propellant tank 16 and a reaction control system hydrazine tank 18. The cold vapor pressurization system 20 for engine start and the cold vapor pressurization for 22 for engine burn are also illustrated in block diagram.

FIG. 2 illustrates the cold vapor pressurization system 20 for engine start. It has a source of hydrazine ($N_2H_2$) 24 that passes through gas generator 26 where it is disassociated. It then enters inlet port 28 of heat exchanger 30 and exits through outlet port 32. The gas then travels along tubing 34 to inlet port 36 of heat exchanger 38. After passing through this heat exchanger it exits through outlet port 40 through tubing 42 and orifice 44 to the RCS settling thrusters 46.

Heat exchanger 30 has a first fluid circuit having an oxidizer tank 50 that is connected to a pump 51. The liquid oxidizer is passed through a tube having a solenoid control valves 52 and then into inlet port 53 on the cold side of heat exchanger 30. The vaporized oxidizer exits outlet port 54 and is passed through a tube that has a solenoid control valve 55 and an orfice plate 57. The cold vapor is then returned to oxygen tank 50. Oxidizer tank 50 is also connected by tubing 56 to engine 12.

A second fluid circuit has a propellant tank 60 connected to a pump 61 that passes the liquid fuel through a tube having their a solenoid control valve 62 and then into the inlet port 63 of heat exchanger 38. The vaporized fuel exits outlet port 64 and then is passed through a tube which has a solenoid control valve 65 and orifice plate 66. The cold vaporized fuel then being returned to fuel tank 60. Fuel tank 60 is connected by tubing 68 to engine 12.

What is claimed is:

1. A cold vapor pressurization system for outer space vehicles that is used prior to engine start to pressurize its fuel tank and oxidizer tank to produce the required engine net positive suction pressure comprising:

an outer space vehicle having an engine, a propellant tank, an oxidizer tank, and a source of hydrazine;

a first heat exchanger having hot side inlet and outlet ports and cod side inlet and outlet ports; means connecting said source of hydrazine to the hot side inlet port of said first heat exchanger;

a first fluid circuit having its one end connected to the cold side inlet port and its other end connected to the cold side output port of said first heat exchanger, said fluid circuit comprising an oxidizer tank and a pump for pumping the oxidizer through said first heat exchanger;

a second heat exchanger having a hot side inlet and outlet ports;

means connecting the hot side outlet port of said first heat exchanger to the hot side inlet port of said second heat exchanger;

a second fluid circuit having its one end connected to the cold side inlet port and its other end connected to the cold side outlet port of said second heat exchanger, said second fluid circuit comprising a fuel tank and a pump for pumping the fuel through said second heat exchanger; and means for expelling the cooled hydrazine by-product from the hot side outlet port of said second heat exchanger whereby oxidizer from said oxidizer tank is vaporized by said first heat exchanger elevating is pressure relative to said oxidizer in said oxidizer tank thereby pressurizing said oxidizer in said oxidizer tank and fuel from said fuel tank is heated by said second heat exchanger elevating its pressure relative to said fuel in said fuel tank thereby pressurizing said fuel in said fuel tank.

2. A cold vapor pressurization system as recited in claim 1 wherein said means connecting said source of hydrazine to said first heat exchanger comprises a gas generator for dissociating the hydrazine.

3. A cold vapor pressurization system as recited in claim 1 wherein said means for expelling the cooled hydrazine by-products from the second heat exchanger comprises a tubular member having an orifice plate intermediate its length.

* * * * *